(12) United States Patent
Dröscher et al.

(10) Patent No.: US 7,240,904 B2
(45) Date of Patent: Jul. 10, 2007

(54) SECONDARY SEALING ELEMENT

(75) Inventors: Peter Dröscher, Geretsried (DE); Klaus Lang, Beuerberg (DE); Günther Lederer, Geretsried (DE); Josef Nosowicz, Geretsried (DE); Andreas Schrüfer, Wolfratshausen (DE); Georg Steigenberger, Münsing (DE); Peter Waidner, Peissenberg (DE)

(73) Assignee: Burgmann Industries GmbH & Co. KG, Wolfratshausen (DE)

( * ) Notice: Subject to any disclaimer, the term of this patent is extended or adjusted under 35 U.S.C. 154(b) by 35 days.

(21) Appl. No.: 10/534,526

(22) PCT Filed: Nov. 12, 2003

(86) PCT No.: PCT/EP03/12659

§ 371 (c)(1),
(2), (4) Date: Oct. 14, 2005

(87) PCT Pub. No.: WO2004/046591

PCT Pub. Date: Jun. 3, 2004

(65) Prior Publication Data

US 2006/0103074 A1    May 18, 2006

(30) Foreign Application Priority Data

Nov. 20, 2002    (DE)    ............... 202 17 983 U

(51) Int. Cl.
*F16J 15/32*    (2006.01)
(52) U.S. Cl. ............... 277/349; 277/564; 277/567; 277/395; 277/584

(58) Field of Classification Search ............... 277/349, 277/353, 394–395, 564, 567, 584, 551, 390
See application file for complete search history.

(56) References Cited

U.S. PATENT DOCUMENTS

| 3,897,957 A | * | 8/1975 | Warner ............... 277/373 |
| 4,586,718 A | * | 5/1986 | Stephenson et al. ........ 277/422 |
| 5,297,804 A | * | 3/1994 | Siegrist et al. .............. 277/433 |

(Continued)

FOREIGN PATENT DOCUMENTS

DE    91 10 799.7    10/1991

(Continued)

*Primary Examiner*—Vishal Patel
(74) *Attorney, Agent, or Firm*—Scott D. Wofsy; Edwards Angell Palmer & Dodge LLP

(57) ABSTRACT

A secondary sealing element comprises a base body (12) made of a synthetic material and comprising a base portion (13) and a seal portion (14) which each comprise coaxially aligned, axially adjacent through bores (17, 31) for the passage of a component, and an annular disc element (25) accommodated in the base portion and comprising a through bore (30) coaxially aligned with the through bores in the base and seal portions and being made of a material which differs from that of the base body. In the unloaded state, the through bore (30) of the annular disc element (25) has a radial dimension d which is greater than that $D_2$ of the through bore (31) in the seal portion (14) and smaller than that $D_1$ in the base portion (13) of the base body (12). The annular disc element consists of a carbon material. An important field of application for the secondary sealing element is that of mechanical face seals for sealing relatively moveable components.

7 Claims, 1 Drawing Sheet

Figure 1:
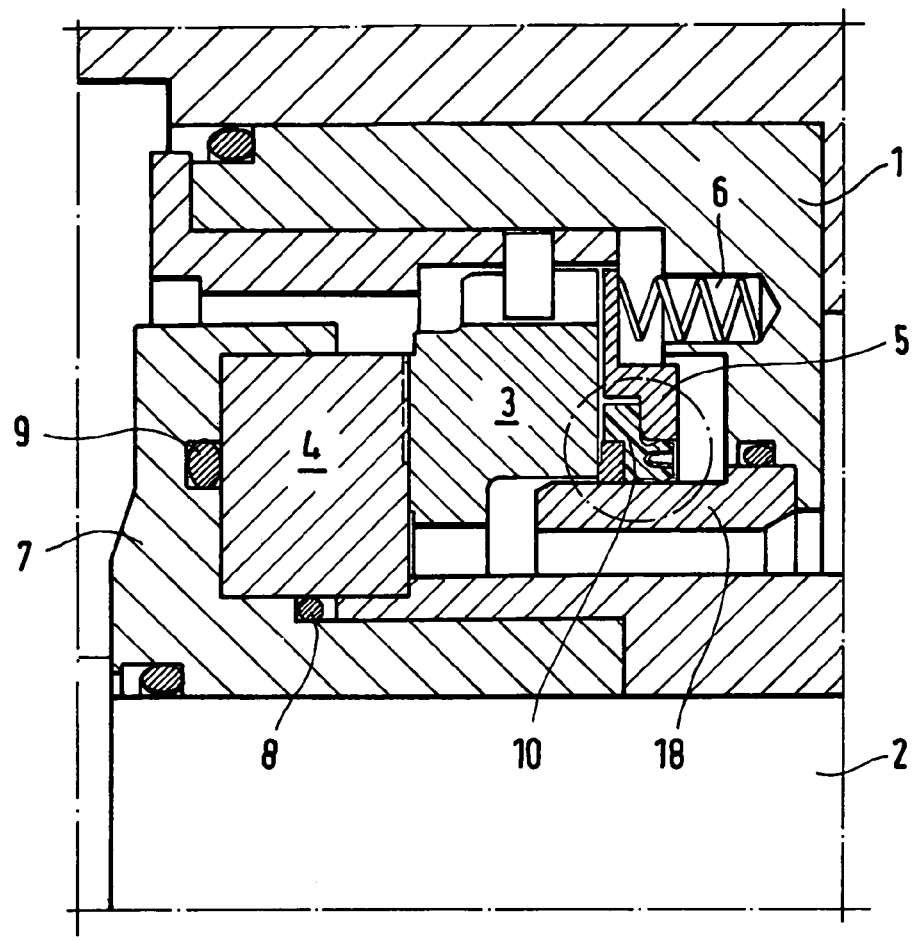

U.S. PATENT DOCUMENTS 5,700,013 A * 12/1997 Baty .................... 277/340
5,921,556 A *  7/1999 Bauman et al. ......... 277/560
6,116,610 A *  9/2000 Goldswain et al. ..... 277/395
6,464,231 B2  10/2002 Burroughs
7,055,825 B2 *  6/2006 Watanabe et al. ...... 277/349

FOREIGN PATENT DOCUMENTS

| | | |
|---|---|---|
| DE | 693 28 309 T2 | 6/1994 |
| DE | 295 18 119 | 1/1996 |
| DE | 296 12 203 | 9/1996 |
| DE | 198 30 645 A1 | 7/1998 |
| DE | 202 02 179 | 5/2002 |
| EP | 0 867 647 A2 | 9/1998 |
| JP | 10047494 A | 2/1998 |

* cited by examiner

SECONDARY SEALING ELEMENT

The invention relates to a secondary sealing element in accordance with the preamble of claim 1.

The invention relates in particular to a secondary sealing element for use with a mechanical face seal device which is designed to be used for the purposes of sealing gaseous media at high to very high pressures where there is a danger of the material of the secondary sealing element flowing or being extruded into the narrow gaps requiring sealing formed between adjacent components whose movement relative to one another must be ensured. A secondary sealing element has already been proposed (DE-U-29518119) wherein, for the purposes of preventing such extrusion, a rigid supporting element is embedded in a base body consisting of a flexible synthetic material in such a way that it practically covers an entrance to the gap requiring sealing whereby the material of the secondary sealing element is prevented from entering into the gap. The rigid supporting element does not perform a sealing function. Rather, this function is retained exclusively by the base body of the known secondary sealing element. Although indeed the penetration of the material of the secondary sealing element into the gap requiring sealing can be effectively prevented by these known measures, nevertheless high pressures, especially in the presence of high temperatures, cannot be reliably sealed using the known secondary sealing element i.e. there is a danger that under such operational conditions the freedom of movement of the component concerned, which may be a biased seal ring, cannot be ensured. On the other hand, free movement of the seal ring in an axial direction is an essential prerequisite for its sealing effect and for adequate operational reliability especially for the sealing of gases. Moreover, lack of mobility can have substantial harmful effects.

The object of the invention is to provide a secondary sealing element of the type mentioned hereinabove which is suitable for use at normal to very high pressures and in the presence of gaseous media requiring sealing by ensuring adequate mobility of components which are moveable relative to one another and which are to be mutually sealed by the secondary sealing element.

This object is achieved by means of a secondary sealing element consisting of a base body of a synthetic material and comprising a base portion and a seal portion. The base and seal portions each include a through bore for the passage of a component, said through bores are axially adjacent and coaxially aligned with each other. An annular disc element is accommodated in said base portion and includes a through bore coaxially aligned with the through bores in the base and seal portions. The annular disc element is made of a material which differs from that of the base body. According to the invention, the through bore of the annular disc element has a radial dimension which, in the unloaded state, is greater than that of the through bore in the seal portion and smaller than that in said base portion of the base body, and in that the material of the annular disc element comprises a carbon material. At low pressures of the medium, there is practically no load on the annular disc element and the seal portion of the base body consisting of the flexible synthetic material performs the sealing function practically alone. The sealing forces arising thereby can easily be optimised in regard to adequate movement of the component concerned (seal ring). By contrast, at higher pressures of the medium, the sealing function is shifted more and more onto the ring seal element which is now pressed into sealing engagement with the surface requiring sealing. A gap between the components requiring sealing is thereby closed at the same time. Because of the good tribological properties of the carbon material, the movement of the component concerned (seal ring) is maintained to an adequate extent despite the firm engaging relationship between the ring seal element and the surface. Under high pressure conditions, the load on the seal portion of the base body may be relieved entirely. In accordance with a further development of the invention, the secondary sealing element can be provided in a recess in an end face of the base portion and project axially beyond the face. The secondary sealing element thereby simultaneously produces a radial and an axial sealing effect.

The invention will be explained in more detail hereinafter with the aid of an embodiment and the drawing. Wherein:

FIG. 1 is a longitudinal sectional view of a mechanical face seal device shown in a state of mounting on a shaft of a apparatus and having a secondary sealing element in accordance with an embodiment of the invention, and FIG. 2 in an enlarged sectional detailed view the secondary sealing element of FIG. 1, Although the invention is described hereinafter in connection with a preferred use thereof as a secondary sealing element for a mechanical face seal device, it is not limited to this field of application. Rathermore, it can also be used to advantage where there is a danger that seals made of elastomeric material usually used for sealing relatively moveable components could be destroyed at higher pressures and/or temperatures.

As is shown in FIG. 1, the mechanical face seal device comprises a pair of seal rings 3, 4 of which one, namely, the seal ring 3, is held stationary with respect to a housing 1, whilst the other seal ring 4 is connected to a shaft 2 for common rotation therewith. In the housing 1, there is a biasing means 6 acting on a thrust ring 5 that is moveable axially in the housing 1 and upon which the seal ring 3 is axially supported so that the seal ring 3 is pressed against the rotary seal ring 4 by the bias force exerted by the spring means 6. The seal ring 4 is sealed in suitable manner, e.g. by means of an O-ring 9 seated in a groove of a driver housing 7. A tube-like driver ring 8 is provided on the shaft 2 between the seal ring 4 and a mounting attachment (not shown in detail in the drawing) in order to transfer the rotation of the mounting attachment to the seal ring 4. The previously described construction of a mechanical face seal device is known to the skilled person so that there is no need to go into further detail.

For the purposes of sealing the thrust ring 5 and thus the stationary seal ring 3 with respect to the housing 1, there is provided a secondary sealing element which bears the general reference number 10 in FIG. 1 and is arranged in an L-shaped shouldered seating bore 11 in the thrust ring 5.

Figure 2:
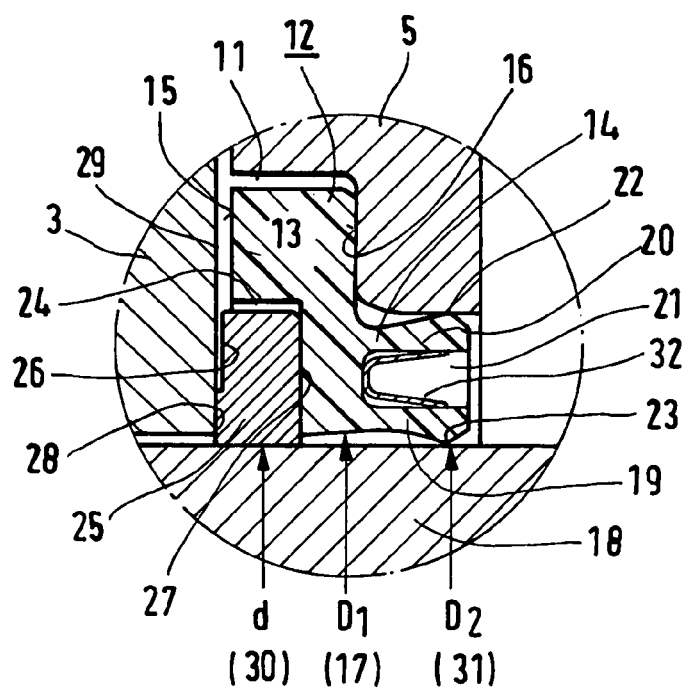

FIG. 2 shows the secondary sealing element 10 on an enlarged scale. As shown therein, the secondary sealing element 10 comprises an annular base body 12 having an L-shaped cross section and consisting of a suitable flexible synthetic material such as polytetrafluoroethylene (PTFE). The base body 12 is composed of a base portion 13 and a seal portion 14 which are axially adjacent and represent integral components of the base body 12. The base portion 13 has an essentially rectangular solid cross section which is axially bounded by an outer end face 15 facing the seal ring 3 and an inner end face 16 facing the thrust ring 5 and contains a through bore 17 having a radial dimension $D_1$ through which a sleeve 18 extends that is mounted on the housing 1 in sealing manner. The thrust ring 5 and the seal ring 3 are seated on the sleeve 18 in longitudinally displaceable manner.

The seal portion 14 projects axially from the inner end face 16 of the base portion 13 close to the through bore 17. The seal portion 14 comprises a pair of parallel, radially spaced web elements 19, 20 which extend axially and delimit an annular space 21 therebetween. Sealing surfaces 22, 23 are provided on ball type calotte-shaped protrusions on the outer surfaces of the web elements 19, 20.

The radially inner sealing surface 23 of the seal portion 14 defines a through bore 31 having a radial dimension $D_2$ which is smaller than that of the through bore 17 in the unloaded state of the secondary sealing element 5.

As can also be taken from FIGS. 1 and 2, a spring element 32 in the form of a U-shaped expansion spring can be arranged in the annular space 21 for spreading the web elements 19, 20 radially apart from each other so that the sealing surfaces 22, 23 are biased so as to rest firmly against the neighbouring surfaces requiring sealing in a predeterminable manner.

An annular disc element 25 of rectangular cross section is accommodated in a recess 24 in the outer end face 15 of the base portion 13 in such a way that its outer axial end face 26 projects axially beyond the end face 15 of the base portion 13 by a suitable small amount. The annular disc element 25 could also be mounted externally on the base portion 13. The inner axial end face 27 of the annular disc element 25 rests in sealing manner against a neighbouring surface of the recess 24. At least a partial surface portion as indicated by 28 of the end face 26 is in sealing engagement with a facing end face 29 of the seal ring 3.

One feature of the ring seal element 25 is that it is formed of a carbon material. This material is characterised on the one hand by good elasticity and inherent stability and hence sealing properties, and, on the other hand, the thermal expansion behaviour thereof corresponds essentially to that of relevant carbide hard materials such as tungsten carbide WC. A suitable carbon material can correspond to that used for forming seal rings of mechanical face seals and is described with further cross references in Burgmann Lexikon, ABC der Gleitringdichtung, self published 1988, page 125. Particularly preferred is a so-called synthetic coal, see Burgmann, page 133, loc cit., which may be impregnated with synthetic resin or another suitable material such as antimony.

Another feature of the ring seal element 25 is that it contains a through bore 30 through which the sleeve 18 can be inserted with suitable play in the unloaded state of the ring seal element 25. The through bore 30 is coaxial with the through bore 17 of the base portion 13 and has a radial dimension d which is smaller than the radial dimension $D_1$ of the base portion 13 in the unloaded state of the secondary sealing element 10. A further feature of the ring seal element 25 is that the radial dimension d is larger than that $D_2$ of the through bore 31 of the seal portion 14 in the unloaded state. As can also be taken from FIGS. 1 and 2, the pressure of a medium requiring sealing, wherein this is preferably, but not exclusively, a gas, is effective both radially and axially on the ring seal element 25 in that the medium can penetrate into the gap (shown enlarged to an exaggerated extent in the drawing) between the outer periphery of the ring seal element 25 and the inner periphery of the recess 11 and also between the seal ring 3 and the end face 26. As a consequence thereof, the ring seal element 25 experiences a radial upsetting which becomes greater as the pressure of the medium increases. Thus, as the pressure of the medium increases, the ring seal element 25 is pressed into ever firmer sealing engagement with the neighbouring surface of the sleeve 18 in order to seal the radial gaps between the seal ring 3 and the sleeve 18. The seal portion 14 is thereby practically freed of pressure. By contrast, for smaller pressures of the medium, the sealing is effected primarily by the seal portion 14 due to the engagement between the radially inner sealing surface 23 thereof and the surface of the sleeve 18 since here, the contact pressure on the ring seal element 25 is not sufficient to obtain an adequate sealing effect due to the above-mentioned radial dimensions of the through bores 30, 31. The radial bias force with which the sealing surface 23 is pressed against the surface of the sleeve 18 can be set in such a way that the axial movement of the thrust ring is not substantially impaired, i.e. defined radial sealing forces are present which do not cause an unwanted "hang-up effect" at low pressures of the medium. This freedom of movement is also ensured at high pressures of the medium because of the good tribological properties of the carbon material from which the ring seal element 25 is formed. An effect can likewise be had on the freedom of movement of the ring seal element 25 by suitably dimensioning the axial dimensions thereof. At the same time, the ring seal element 25 prevents the danger of a flow or extrusion of the material of the base body 5 into the gaps under high pressure conditions.

The sleeve 18 should preferably consist of a wear-resistant hard material such as tungsten carbide WC which has a similar coefficient of thermal expansion to that of the carbon material of the ring seal element 25 in order to prevent thermally induced internal stresses in the ring seal element 25.

The invention was described hereinabove on the basis of an embodiment wherein the ring seal element can simultaneously produce an axial and a radial sealing effect. However, the invention is not restricted to such an arrangement, but rather, it also encompasses an arrangement wherein the ring seal element can only fulfil a radial sealing function in that it is arranged entirely within the contours of the base body. The construction of the seal portion is not limited to the provision of radially expandable web elements. The seal portion could also be in the form of an e.g. labyrinth seal or a simple lip seal. Finally, the secondary sealing element according to the invention can be provided for use in connection with both the stationary and the rotary seal ring. Although the use of a carbon material is preferred, other suitable materials having the same or similar properties are also to be regarded as falling within the expression "carbon material".

The invention claimed is:

1. A secondary seal element including a base body made of a synthetic material, said base body comprising a base portion and a seal portion, said base and seal portions including coaxially aligned, axially adjacent through bores for the passage of a component, and an annular disc element accommodated in said base portion and including a through bore coaxially aligned with the through bores in the base and seal portions, said annular disc element being formed of a material which differs from that of the base body, wherein in the unloaded state, the through bore of said annular disc element has a radial dimension d which is greater than that $D_2$ of the through bore of said seal portion and smaller than that $D_1$ of said base portion of the base body, wherein the annular disc element is formed of a carbon material, and wherein the annular disc element is disposed in a recess in an end face of the base portion and projects axially beyond the end face and further in such manner so that a pressurized fluid can exert a radially inward force on at least a portion of a radially outermost surface of the annular disc element when the secondary seal element is in a loaded state.

2. The secondary seal element according to claim 1, wherein the synthetic material of the base body comprises PTFE.

3. The secondary seal element according to claim 1, wherein the seal portion comprises a pair of radially spaced resilient web elements having opposed outwardly directed sealing surfaces.

4. The secondary seal element according to claim 3, further comprising means for radially expanding the web elements in a resilient manner.

5. The secondary seal element according to claim 1, wherein the base portion has an essentially rectangular cross section.

6. A mechanical face seal device comprising a pair of cooperating seal rings of which one is urged towards the other by an axial bias force and is axially moveably disposed on a sleeve, wherein for the purpose of sealing said one sealing seal ring with respect to the sleeve, a secondary seal element is disposed in a thrust ring seated on the sleeve in an axially moveable manner for transmitting said bias force, the secondary seal element including a base body made of a synthetic material, said base body comprising a base portion and a seal portion, said base and seal portions including coaxially aligned, axially adjacent through bores for the passage of a component, and an annular disc element accommodated in said base portion and including a through bore coaxially aligned with the through bores in the base and seal portions, said annular disc element being formed of a material which differs from that of the base body, wherein in the unloaded state, the through bore of said annular disc element has a radial dimension d which is greater than that $D_2$ of the through bore of said seal portion and smaller than that $D_1$ of said base portion of the base body, wherein the annular disc element is formed of a carbon material, and wherein the annular disc element is disposed in a recess in an end face of the base portion and projects axially beyond the end face and further in such manner so that a pressurized fluid can exert a radially inward force on at least a portion of a radially outermost surface of the annular disc element when the secondary seal element is in a loaded state, and wherein the sleeve is formed of a material having a coefficient of thermal expansion which essentially corresponds to that of the carbon material of the annular disc element.

7. The mechanical face seal device according to claim 6, wherein the sleeve is formed of tungsten carbide.

* * * * *